United States Patent [19]

Mosch et al.

[11] Patent Number: 5,214,121
[45] Date of Patent: May 25, 1993

[54] PROCESS FOR MANUFACTURING DIOLS AND POLYURETHANES CONTAINING PERFLUOROALKYL RADICALS

[75] Inventors: Franz Mosch, Diedorf; Simpert Lüdemann, Bobingen; Michael Bernheim, Aystetten, all of Fed. Rep. of Germany

[73] Assignee: Ciba-Geigy Corporation, Ardsley, N.Y.

[21] Appl. No.: 702,800

[22] Filed: May 17, 1991

[30] Foreign Application Priority Data

May 21, 1990 [DE] Fed. Rep. of Germany ....... 4016329

[51] Int. Cl.⁵ .......................................... C08G 18/08
[52] U.S. Cl. ........................................ 528/49; 528/55; 528/63; 528/65; 528/70; 528/71; 427/389.9; 427/393.4
[58] Field of Search ............. 528/49, 55, 65, 63, 528/70, 71; 427/389.9, 393.4

[56] References Cited

U.S. PATENT DOCUMENTS

| | | | |
|---|---|---|---|
| 4,054,592 | 10/1977 | Dear et al. | 560/25 |
| 4,504,401 | 3/1985 | Matsuo | 252/8.75 |
| 4,898,981 | 2/1990 | Falk et al. | 568/98 |
| 5,019,428 | 5/1991 | Lüdemann et al. | 427/387 |
| 5,057,377 | 10/1991 | Karydas et al. | 428/447 |

Primary Examiner—John Kight, III
Assistant Examiner—Duc Truong
Attorney, Agent, or Firm—Kevin T. Mansfield; Edward McC. Roberts

[57] ABSTRACT

Diols containing perfluoroalkyl radicals are produced by reacting compounds of the formula $$R_f—(E)_m—X'—H$$

($R_f$=perfluoroalkyl radical, E is an alkylene group optionally interrupted by certain groups and/or substituted at the end, m=0 or 1, X'—H=—CONRH, —SO$_2$NRH or —SH) in a first step with diols containing at least 2 halogen atoms. Preferably the obtained products are reacted in a second reaction step with polyvalent isocyanates to prepolymers with free —NCO— or free —OH—groups and these prepolymers are reacted in a third step with compounds containing isocyanate groups and/or hydroxyl groups. The first reaction step is carried out in an aprotic solvent which is insoluble in water, in the presence of an aqueous solution of an alkali metal carbonate. Intermediate products have not to be isolated.

The obtained polyurethanes can be used in form of aqueous dispersions for the oil- and water repellent finishing of textiles.

21 Claims, No Drawings

PROCESS FOR MANUFACTURING DIOLS AND POLYURETHANES CONTAINING PERFLUOROALKYL RADICALS

The present invention relates to a process for manufacturing diols and polyurethanes containing perfluoroalkyl radicals, polyurethanes manufactured according to this process and the use of the polyurethanes in form of aqueous dispersions for finishing fibrous materials, especially textiles.

From the European patent application 348 350 polymers containing perfluoroalkyl radicals, such as polyurethanes, polyureas, polyesters and polycarbonates, are known. For manufacturing these polymers diols containing perfluoroalkyl radicals of the general formula III A

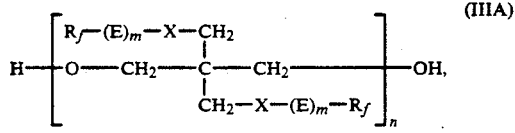

are used as starting materials, in which $R_f$ is a straight-chain or branched-chain perfluoroalkyl radical with 1 to 18 C-atoms, which may be substituted by a perfluoroalkoxy radical with 2 to 6 C-atoms, and E is a branched- or straight-chain alkylene radical with 1 to 10 carbon atoms which may be interrupted by 1 to 3 divalent links of the formula —NR—, —O—, —S—, —SO$_2$—, —COO—, —OOC—, —CONR—, —NRCO—, —SO$_2$NR— and —NRSO$_2$—, and which optionally has at one end a —SO$_2$NR— or —CONR— group, the radical $R_f$ being bonded to the sulphur atom or the carbon atom of this group, m=0 or 1 and in case m=0, X=—S—, —O—, —SO$_2$— or —NR— and in case m=1, X=—CONR— or —SO$_2$NR, with $R_f$ being bonded to the sulphur atom or the carbon atom and R means an alkyl radical with 1 to 6 C-atoms, and n=1,2 or 3. For manufacturing polyurethanes these diols containing perfluoroalkyl radicals are reacted with di- or polyisocyanates and, subsequently reacted with chain-extending agents and further di- or polyisocyanates. The polymers known from this prior art show an improved thermal stability, lead to oil- and water repellent finishes and coatings and provide soil-release properties on various materials, such as textiles, glass, paper or leather.

According to EP-A 348 350 the diols containing perfluoralkyl radicals of the general formula III A are obtained by means of a nucleophilic substitution by reaction of compounds of the general formula I A

with diols containing at least 2 halogen atoms of the general formula II A

wherein Y=Br, Cl or I and $R_f$, E, X, m and n have the above-mentioned meaning. For the manufacturing of polyurethanes the diols of formula III A obtained after this first reaction step are then reacted in a second reaction step in undissolved form or dissolved in a solvent with polyvalent isocyanates to yield prepolymers with free hydroxyl- resp. free isocyanate groups, depending on whether the isocyanates are used in a stoichiometric deficit or excess relative to the hydroxyl groups of the diols.

In a further, the 3rd reaction step, these prepolymers are reacted in a known manner with a chain-extending agent containing hydroxyl groups or with further isocyanate or with their combination, to give the desired polyurethanes containing perfluoroalkyl radicals (see also U.S. Pat. No. 4,054,592).

As shown above the polyurethanes containing perfluoroalkyl radicals obtained according to the prior art, are obtained in a three-step reaction, viz.:

1. step: Reaction of compounds of the general formula I A with compounds of the general formula II A to form compounds of the general formula III A 2. step: Further reaction of the diols III A containing perfluoroalkyl radicals with a stoichiometric deficit resp. excess of di- and/or polyisocyanates to form prepolymers with free hydroxyl- resp. free isocyanate groups and 3. step: Further reaction of the prepolymers with chain-extending agent containing hydroxyl groups or with further isocyanate or with their combination, to form the desired polyurethanes.

Aqueous dispersions containing these polyurethanes can be prepared by known methods.

As the mentioned prior art shows, the reaction of the first reaction step, as far as the compounds I A have a sufficiently acid hydrogen atom, is carried out under water-free conditions in an aprotic solvent at elevated temperature in the presence of solid alkali metal carbonate, especially potassium carbonate, and subsequently the resulting compounds of formula III A are isolated.

According to the prior art (EP-A 348 350) compounds with sufficiently acid hydrogen atom are such of the general formula I A

where $R_f$, E, X and m have the meaning indicated above for formula III A.

The process according to EP-A 348 350 to prepare diols of formula III A suffers from the drawback that the reaction of the compounds of the general formula I A dissolved in a solvent, with the compounds of the formula II A in the presence of solid alkali metal carbonate under water-free conditions takes a very long time. Thus, for the reaction of perfluoroalkyl ethyl thiols (formula I A: E=—CH$_2$CH$_2$—, X=—S—) with 2,2-Bis-(bromomethyl)-1,3-propane diol (formula II A: Y=Br, n=1) reaction times of 16 h and more at about 100° C. are disclosed. Subsequently the resulting KBr must be removed by washing out or by heat-filtration. It has been found that, when washing out with water, the aqueous phase only separates after a long standing and, moreover, as upper layer. It must then be sucked off from the top or the organic phase must be filled into an appropriate vessel. Frequently it is insufficient to wash out only once, so that it must be washed for a second time, which takes a lot of time. Moreover, difficulties occur with the heat filtration, because when cooling down there may result precipitates due to exceeding the solubility limit and thus filtration is no longer possible.

It is the object of the present invention to improve the above-described process for manufacturing diols and polyurethanes containing perfluoroalkyl radicals. This object is achieved by a process according to claim 1, (manufacture of the diols) and by a process according to claim 2 (manufacture of the polyurethanes).

The compounds of the formula I in claim 1 differ from the compounds of the formula I A (prior art) by the definition of X' instead of X whereby it is expressed that the compounds of formula I must have a sufficiently acid hydrogen atom. Accordingly the meaning of X' is also included in the formula III. The group X'—H in formula I (see claim 1) represents one of the following radicals: —CO N(R)H or —SO$_2$N(R)H or —SH. In all these cases the hydrogen atom in the radical X'—H is sufficiently acid so that compound of formula I can react with compound of formula II in a process according to claim 1, by splitting off HY.

The statement in claim 1, according to which E can be interrupted a.o. by

—COO— or —OOC— resp. —CONR— or —NRCO— resp. —SO$_2$NR— or —NRSO$_2$— means that these 3 pairs of radicals are, indeed, divalent radicals which are equal among one another, that, however, optionally the one or the other end of the corresponding radical can be facing the radical R$_f$.

Surprisingly, it has been found that the reaction of the 1. step (manufacture of diols of formula III) proceeds much faster and so the process can be made much more economical if in this step an aprotic substantially water-insoluble solvent is used as solvent for the compounds of the formula I and the compounds of the formula II and if the alkali metal carbonate necessary for the reaction, in particular potassium carbonate, is dissolved in water, i.e. if a liquid/liquid 2-phase reaction is carried out. This reaction is completed within an essentially shorter time as compared with the disclosure of the prior art (EP-A 348 350). It is quite particularly surprising that the working-up of the 2-phase reaction solution is extremely easy. The concentration of the alkali metal carbonate solution (especially of the potassium carbonate solution) in water is preferably adjusted to such a value that the density of the alkali halogenide solution (especially potassium bromide solution) formed in the reaction is sufficiently high so that after termination of the reaction the aqueous phase separates as lower organic phase. In this case after termination of the reaction the aqueous phase separates quickly and completely as lower phase from the reaction mixture even at elevated temperatures and can easily be separated from the organic phase.

It has proved very advantageous to carry out the separation of the aqueous phase already at elevated temperature, i.e. at temperatures only a few ° C.-degrees below the boiling point of the reaction mixture of the first reaction step, because in this case separations of reaction products in the organic phase can be avoided and no alkali metal halogenide such as potassium bromide separates from the aqueous phase.

In view of the statements in the already cited EP-A 348 350 the fact that the aqueous phase can be easily separated from the organic phase is very surprising because, according to this EP-A working with an aqueous system is, indeed, disclosed as a possibility, but working-up of such a system is regarded as difficult. According to the invention these difficulties are avoided by the utilization of a solvent substantially insoluble in water and the preferred utilization of the alkali metal carbonate solution in a concentration allowing the separation of the resulting aqueous alkali metal halogenide solution as lower phase.

From the solutions obtained in reaction step 1 which contain the compounds of the formula III small remaining amounts of water are removed, e.g. by means of an azeotropic distillation. The substantially water-free organic solutions can be used in a process according to claim 2 for the reaction with the isocyanates (2nd reaction step), without any further measures, optionally after having been adjusted to a desired concentration by means of the addition of solvent. It is also possible to remove one solvent from the solution obtained according to the first step which contains the diols and to isolate the diols. This may be suitable in case the diols are to be used for other purposes than reaction with isocyanates.

As compounds of the general formula I such compounds are preferred on account of their easy availability in which m=1, E is an alkylene bridge with 2 to 6 C-atoms and X'=—S—. It goes without saying that the compounds containing perfluoroalkyl radicals with 1 to 18 perfluorinated C-atoms (the perfluoroalkyl radical optionally being substituted by a perfluoralkoxy radical with 2 to 6 C-atoms) are not chemically uniform compounds with definite chain lengths but—because of technical reasons—mixtures of compounds containing perfluoroalkyl radicals. Compounds are preferred which contain a perfluorinated alkyl radical with 6 to 14 C-atoms on the average.

As diols of the general formula II which contain at least 2 halogen atoms there are no limitations in respect to the prior art. Consequently the formulae II and II A have the same meaning. The marking I, II, III (invention) resp. I A, II A and III A (prior art) was chosen only for practical reasons in order to distinguish between prior art and invention. Thus, also for the process according to the invention the Bis-(2,2-bisbromomethyl-3-hydroxy-n-propyl)-ether (formula II: Y=Br, n=2) and especially the 2,2-Bis-(bromomethyl)-1,3-propanediol (formula II: Y=Br, n=1) are preferred. The alkali metal carbonate, potassium carbonate being preferred, is used in form of a concentrated aqueous solution in an amount which is approximately equivalent to the separating halogen atom of compounds II, i.e. which is sufficient for the substantially complete neutralisation of the resulting acid HY, a slight excess of alkali metal carbonate being preferred.

The compounds of the formula I, too, are used in such an amount that the content of active hydrogen atoms in these compounds I is substantially equivalent to the content of separating halogen atoms of the compound II.

For the first step of the process according to the invention proper selection of the solvent is of special importance. While according to the prior art (EP-A 348 350) in general aprotic solvents, such as N- methylpyrrolidone, N,N-dimethylformamide, dimethylsulfoxide and similar solvents as well as ketones, such as acetone or other dialkylketones are suitable, the aprotic solvents in the process according to the invention, must be substantially insoluble in water. Moreover, while being heated in the presence of the aqueous alkali metal carbonate solutions they must not undergo any chemical modifications of such a kind that products result which are soluble in water or which react with the compounds of the formulae I or II or which dissolve the resulting alkali metal halogenide. For this reason, esters as solvents are practically out of consideration on account of the danger of saponification. Finally, it is advantageous, if the solvent used has a boiling point above 90° C., especially above 110° C. This is preferred, because when heating solvents with low boiling points in the presence of the aqueous alkali metal carbonate solution, relatively low boiling azeotropes may result which leads to a prolongation of the reaction time.

For the same reason it is preferred, but not absolutely necessary, to perform the first reaction step of the process according to the invention in a closed vessel, because thus temperatures of 100° C. to approx. 140° C. may be applied and so the reaction can be accelerated. It is not necessary to increase the pressure by applying inert gases, e.g. nitrogen, since increased pressure results automatically because of autogenous pressure depending on the boiling point of the solvent used, the desired reaction temperature and the carbon dioxide formed during the reaction. In order to avoid unnecessarily high pressures it is reasonable to select water-insoluble, aprotic solvents with a boiling point above 90° C., especially above 110° C.

Moreover, it goes without saying, that the solvents must be able to dissolve to a sufficient extend both the compounds of the formulae I and II and the reaction products of the formula III.

For these reasons especially ketones have proved to be suitable solvents. Examples for suitable ketones with a boiling point exceeding 90° C. are methyl-n and -iso-propylketone and diethylketone, examples for suitable ketones with a boiling point exceeding 110° C. are ethyl-iso-propyl-, methyl-iso- butyl-, ethyl-n-propyl-, and di-iso-propylketone as well as the various amylketones. For practical reasons methyl-iso-butylketone is preferred among all mentioned solvents. It is preferred to carry out the reaction in the presence of small amounts of known phase-transfer catalysts (interphase catalysts), quaternary ammonium compounds being preferred as phase-transfer catalysts.

The reaction mixture which contains the compounds I and II, the aqueous alkali metal carbonate solution in the quantities indicated, the solvent and optionally a phase-transfer catalyst, is heated to 90°-140° C., preferably 100°-120° C. while stirring, preferably in a closed reaction vessel and left at this temperature for about 3 to 8 hours, an autogeneous pressure of about 3 to 6 bar (absolute value) resulting when working in a closed vessel.

After turning off the stirrer, the aqueous phase quickly separates as lower phase due to its high salt content and can be separated substantially completely and easily without cooling or after slight cooling.

The remaining small amount of water is removed from the organic phase, e.g. by azeotropic distillation, optionally after the addition of further solvent. The remaining organic phase which contains as reaction products the perfluoroalkyl-substituted diols of formula III dissolved in the organic solvent is a suitable starting material for the manufacture of polyurethanes containing perfluoroalkyl radicals according to claim 2. For this process the solution is preferably used directly, i.e. without further working up, optionally after adjusting the desired content of solid substance, e.g. by the further addition of solvent, for the further reaction with the di- or polyisocyanate in the second reaction step. This means that preferably the diols of formula (III) are not intermidiatly isolated prior to process step 2 described in claim 2. The process according to claim 2 is explained hereinafter.

For the 2nd reaction step (claim 2) the di- and/or polyisocyanates mentioned in the cited prior art (EP-A 348 350) may be used, viz. both aliphatic and alicyclic, and aromatic di-, tri- and polyisocyanates, preferably diisocyanates of the general formula IV

A(NCO)$_2$     (IV), are used because with three- or multivalent isocyanates insoluble, unsuitable products may be obtained. A represents a divalent, optionally substituted, aliphatic, alicyclic or aromatic radical.

Suitable diisocyanates of the general formula IV are aliphatic ones with an alkylene chain of 2 to 16 C-atoms, alicyclic ones with 6 to 15 C-atoms in the ring and aromatic ones optionally substituted, e.g. by alkyl or alkoxy radicals with 1 to 4 C-atoms, phenylene- or naphthylene-diisocyanates substituted by halogen or nitro groups. Furthermore A may represent the radical

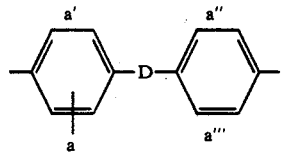

where D stands for a direct bond, an oxygen atom or a methylene- or ethylene group and a, a', a" and a'" independently of each other represent hydrogen or alkyl- or alkoxy radicals with 1 to 4 C-atoms or chlorine or bromine.

For the 2nd reaction step the desired amount of isocyanate, preferably a diisocyanate of the formula IV is added to the solution obtained after the first step which has optionally been adjusted to a desired content of solid substance by the addition of solvent, and contains the perfluoro alkyl- substituted diols of the formula III. It is preferred to carry out the second reaction step under inert conditions and to initiate resp. accelerate it by applying an increased temperature, i.e. of about 60° to 80° C. and by adding catalysts known in the urethane chemistry, as they are specified in detail in EP-A 348 350. For the process according to the invention, a combination of organic tin compounds and tertiary amines has especially proved suitable as catalyst. Whether the reaction has started can be recognized by an increase in temperature. After the end of the reaction the mixture is stirred for another $\frac{1}{2}$ to 1 hour at elevated temperature. As already mentioned above, the isocyanate is added in such an amount that in the second reaction step prepolymers are formed which still contain free hydroxyl groups or free isocyanate groups, i.e. that a stoichiometric deficit or excess of the isocyanate is used. Thus, by the reaction conditions of the 2nd step it is possible to influence the desired properties of the polyurethanes formed in the third reaction step, such as e.g. their emulsifiability and their technical properties.

By means of applying a deficit of isocyanate groups relative to the hydroxyl groups of the diols of the formula III in a preferred embodiment prepolymers with free hydroxyl groups are produced, because in this case the completion of the second reaction step can very simply be recognized by the disappearance of the NCO-groups determined e.g. via IR-spectroscopy. Thus 1.1 to 1.6 mols, especially 1.2 to 1.4 mols of compounds of the formula III are preferably employed per 1 mol of diisocyanate of the formula IV; this means, that the prepolymers obtained in form of solutions after the second reaction step, contain 0.2 to 1.2, especially 0.4 to 0.8 hydroxyl equivalents per mol product obtained by the reaction of the compounds III with the compounds IV.

Correspondingly, if prepolymers still containing free isocyanate groups are to be produced the solutions of the perfluoroalkyl substituted diols of the formula III are reacted with an excess of isocyanate groups relative to the hydroxyl groups of the diols.

Hexamethylene diisocyanate and trimethylhexamethylene diisocyanate (mixture of isomers) are preferred as isocyanates of formula IV for the 2nd reaction step.

Neither the intermediate products (diols) of formula III obtained by the first reaction step nor the prepolymers resulting after the second reaction step and being present in form of solutions need to be isolated prior to carrying out the 3rd reaction step; i.e. these solutions can be applied directly for the 3rd reaction step.

The reaction of prepolymers containing hydroxyl groups only with isocyanates in the 3rd step can lead to polyurethanes containing perfluoroalkyl radicals which are insoluble in all conventional solvents and hardly emulsifiable. It is, therefore, preferred to employ chain-extending agents known in the polyurethane chemistry together with the isocyanates. Polyols, especially polyols with 2 hydroxyl groups are preferred as chain-extending agents. Chain-extending agents mentioned in EP-A 348 350 may be used. Suitable examples are alkane diols with 2 to 16 C-atoms, such as ethylene glycol or propylene glycol, 1,4-butane diol and the corresponding higher homologues, and di-, tri-and tetraethylene glycol, bis(4-hydroxybutyl)ether and bis-hydroxyethyl-thioether. Diols which have incorporated at least 1 tertiary nitrogen atom are especially suitable, that is alkane diols the alkylene radical of which is interrupted by 1 to 3-N(R') groups, wherein R' means an alkyl radical with 1 to 18 C-atoms, or the cyclohexyl-, tolyl-, naphthyl- or pyridyl radical. Examples are N-methyl-, N-butyl-, N-oleyl-, N-cyclohexyl-diethanolamine and the corresponding dipropylamines, N,N-dihydroxyethylaniline and N,N'-bis-hydroxypropylethylene diamine. Instead of these diols themselves, their alkoxylation products can be used, such as products ethoxilated with polyethylene glycol with a molar weight of 200 to approx. 4000, or ethoxylated butyl-diethanolamine and propoxylated methyldiethanolamine (molar weight 2000). N-methyldiethanol- and N-butyldiethanolamine are especially preferred for the 3rd reaction step. If in the second reaction step an excess of diisocyanate had been employed so that prepolymers with free isocyanate groups result, these are reacted in the 3rd step with a chain-extending agent containing at least 2 hydroxyl groups, the same chain-extending agents being suitable resp. preferred as those which were described above for the case of prepolymers with free hydroxyl groups.

If in the 3rd reaction step solutions of prepolymers with free hydroxyl groups are employed, (which is preferred), the amounts of chain-extending agents and isocyanates, especially diisocyanates of the formula IV'

$$A'(NCO)_2 \quad (IV')$$

wherein A' has the same significance as A (see formula IV), are adjusted in such a way that polyurethanes containing perfluoroalkyl groups without or nearly without free isocyanate groups result. Small amounts of remaining isocyanate groups can be removed by means of known chemical processes. Small amounts of hydroxyl groups in the polyurethanes do not lead to drawbacks.

Supposing the hydroxyl equivalent of the prepolymer is 0.4 per mol and 0.6 mols of diisocyanate $A'(NCO)_2$ are to be used, the calculated amount of diol required (chain-extending agent) is 0.4 mols. If, however, in the case of the same prepolymer 1 mol of the compound $A'(NCO)_2$ is to be used, 0.8 mols of the diol are required. In general, the molar ratio of the compound $A(NCO)_2$ to $A'(ACO)_2$ should be about 0.3 to 1.8, especially 0.6 to 1.6.

The diisocyanates of the formula IV' can be selected from the same classes of compounds that have been described above in connection with formula IV. For the 3rd reaction step, however, alicyclic ones with 6 to 15 C-atoms in the ring are preferred. In this 3rd reaction step diisocyanates derived from "dimeric acids", that is from dimerized, unsaturated fatty acids have been found to be especially suitable. Such a diisocyanate is commercially available under the designation "DDI 1410 diisocyanate ®" (Henkel Corp.).

As already mentioned, the solutions which contain the prepolymers obtained after the second reaction step can be used directly, that is without isolation of the prepolymers, for the 3rd reaction step. In most cases it is, indeed, not even necessary to cool down the solutions which still have an increased temperature after the 2nd step, prior to performing the 3rd reaction step.

The necessary amounts of chain-extending agent and isocyanate IV' preferably diluted with solvent, are added to the solutions obtained in the 2nd step. The reaction mixture is stirred and kept at elevated temperature, e.g. at about 60° to 90° C. and the 3rd reaction step is continued, until no more NCO-groups can be detected (IR spectroscopy). At this time the formation of polyurethane is finished.

The 2nd and 3rd reaction steps are carried out in a solvent, preferably the same as has been used for the first step.

The properties of the polyurethanes containing perfluoroalkyl radicals obtained according to the process of the invention are similar to those of the polyurethanes known from EP-A 348 350.

The polyurethanes can be isolated from the solution by distilling-off the aprotic solvent.

Preferably, these solutions are converted to aqueous dispersions which can be achieved by known processes. It is preferred to remove the organic solvent only after dispersion in water, e.g. by distilling-off, preferably under reduced pressure since the presence of the solvent often facilitates the process of dispersing.

The aqueous dispersions of the polyurethanes are suitable for finishing fibrous materials, especially textile materials in order to impart to them oil- and water repellent or "soil release"-properties. They can be applied by means of methods known in the textile industry, either in the padding or coating process, and, of course, also can be used in combination with other agents usual in the textile industry.

The invention will now be illustrated by means of the following examples.

EXAMPLE 1

An autoclave, equipped with a stirring and an external heating device, thermometer, air inlet-- and bottom outlet-valve is charged by adding the following components one by one:

| | | |
|---|---|---|
| 455.2 g = 0.800 mol | tetrahydroperfluoroalkyl mercaptan (composition see below) | |
| 106.0 g = 0.404 mol | 2,2-Bis-(bromomethyl)-1,3-propane diol | |
| 116.0 g = 0.840 mol | potassium carbonate | |
| 120.0 g | methylisobutyl ketone | |
| 160.0 g | demineralized water | |
| 8.0 g = 0.044 mol | tetraethyl ammonium chloride-monohydrate. | |

The mercaptan used corresponds to the formula $R_fCH_2CH_2SH$, where $R_f$ essentially represents $C_8F_{17}-$ to $C_{14}F_{29}$, with a medium molecular weight of 569 and a fluorine content of 68.6%.

The reaction vessel is heated while stirring to an inside temperature of 60° C. until all solid substances are dissolved. Subsequently it is evacuated to 300 mbar and, subsequently, atmospheric pressure is achieved inside the vessel by addition of nitrogen. This process is twice repeated.

After having closed the vessel an inside temperature of 110° C. is obtained by heating after 1.5 hours while stirring, whereby a pressure of 2.5 bar results. After another 5 hours under the same reaction conditions the reaction is finished.

After cooling down to 100° C. stirring is discontinued and after a few minutes two completely separated liquid phases are formed. At first the lower, aqueous phase is removed at the bottom valve and then the solvent phase, which contains the reaction product of the formula III ($E=CH_2-CH_2-$, $X'=-S-$) is discharged into a distillation flask.

Gas-chromatographic analysis of a sample of the solvent phase shows that 92% of the mercaptan have reacted to form the desired S,S'-Bis-(perfluoroalkylethyl)-dithiopentaerythrite.

After addition of 700 g methylisobutylketone the residual water is subsequently distilled off as azeotrope until a 50% solution of the reaction product has formed. Its water content is (determined according to Karl Fischer) below 0.05%. The solution is transferred to a 6-liter 5-neck-flask which is equipped with stirrer, thermometer, nitrogen feed, reflux condenser, feeding vessel and heating device. The 2nd reaction step is performed by first adding a solution of 67.0 g (0.318 mol) trimethylhexamethylene diisocyanate (isomer mixture) in 67.0 g methylisobutylketone with regular stirring and under inert conditions (flushing with nitrogen) and subsequently heating the solution to 80° C. Then

| | |
|---|---|
| 0.3 g | dibutyl tin dilaurate and subsequently |
| 0.12 g | triethylamine |

(catalyst for the formation of polyurethane) are added to the homogenous mixture.

After a short period of time an exothermic reaction takes place, (increase of temperature to about 90° C.). The reaction mixture is stirred at about 85° C. until IR-spectroscopy shows that isocyanate groups are absent. At a temperature of 85° C. (3rd reaction step)

| | |
|---|---|
| 157.0 g = 0.262 mol | DDI - 1410 Diisocyanate ® (Henkel Corp.) |
| 20.5 g = 0.172 mol | N-methyldiethanolamine and |
| 30.0 g | methylisobutylketone | are subsequently added.

Then the reaction mixture is stirred at about 85° C. until IR-spectroscopy shows that isocyanate groups are absent, thus showing that the third reaction step (formation of the polyurethane) is completed.

Depending on the intended use the reaction product (polyurethane) can be isolated or an aqueous dispersion of the polyurethane can be manufactured using a surface-active substance as disperging agent. Subsequent removal of the organic solvent gives an emulsion stable to storage.

In order to form an aqueous dispersion the solution from which the reaction product partly separates on cooling is heated to about 70° C., optionally diluted with further solvent and added, while intensely stirring, to an aqueous solution of 70° C., which contains 75 g of an ethoxylated lauryl oxypropylamine (on the average 10 mols of ethylene oxide per mol) in form of the acetate and 100 g 1,3-propane diol. After homogenization at 300 bar and subsequent removal of the solvent a yellowish, milky, low-viscous, stable dispersion is obtained which, applied without additive or together with known extenders, leads to excellent water- and oil repellent properties of a textile substrate onto which it has been applied.

EXAMPLE 2

The same device as in example 1 is charged with the following components

| | | |
|---|---|---|
| 480.0 g = 1.000 mols | tetrahydroperfluoroalkylmercaptan (composition see below) | |
| 132.5 g = 0.505 mols | 2,2-bis-(bromomethyl)-1,3-propane diol | |
| 145.0 g = 1.050 mols | potassium carbonate | |
| 150.0 g | methyl isobutyl ketone | |
| 200.0 g | demineralized water | |
| 8.5 g = 0.055 mols | tetramethylammonium bromide. | |

The mercaptan corresponds to the formula $R_fCH_2CH_2SH$ (average molecular weight about 480, fluorine content 66,9%), wherein $R_f$ mainly stands for $C_8F_{17}$ with a portion of 5% of $C_6F_{13}CH_2CH_2SH$ and smaller portions of higher mercaptans. The first reaction step is carried out as indicated in example 1.

By means of gas-chromatographic analysis it is found that 90% of the mercaptan have reacted. After the addition of 700 g methylisobutyl ketone the reaction is continued as described in example 1. Residual water content is about 0.04%.

To the solution which contains 50% by weight of compound III ($E=-CH_2CH_2-$, $X'=-S-$, $n=1$), 83.8 g (=0.40 mols) trimethyl hexamethylene diisocyanate dissolved in 83.0 g methylisobutyl ketone are added and the solution is heated to 80° C.

0.4 g tin octoate and subsequently
0.1 g triethylamine
(catalyst) are added to the homogeneous mixture.

After a short period of time the temperature increases to 90° C. The mixture is stirred at 85° C. until isocyanate groups can no longer be detected (end of the 2nd reaction step). Subsequently

| 196.2 g (0.33 mol) | DDI - 1410 Diisocyanate ® and |
| 22.8 g (0.22 mol) | diethylene glycol and |
| 30.0 g | methyl isobutylketone | are added at a solution temperature of 85° C.

The mixture is stirred at 85° C. until isocyanate groups can no longer be detected. The formation of the polyurethane is finished.

The polyurethane solution thus obtained is further processed to form an aqueous dispersion exactly as described in example 1, with the exception that 83 g emulsifier (amine acetate) and 115 g 1,3-propane diol are used.

After homogenization and removal of the solvent a milky, low viscous, stable dispersion is obtained.

We claim:

1. In a process for manufacturing diols containing perfluoroalkyl radicals by reacting in a 1st reaction step a compound of the formula (I)

$$R_f-(E)_m-X'-H \qquad (I)$$

wherein m=0 or 1 and $R_f$ is an unsubstituted straight-chain or branched chain perfluoroalkyl radical with 1 to 18 C-atoms or a branched-chain or straight-chain perfluoroalkyl radical with 1 to 18 carbon atoms substituted by a perfluoroalkoxy radical with 2 to 6 C-atoms, E is a branched-chain or straight-chain alkylene radical with 1 to 10 carbon atoms which may be interrupted by 1 to 3 divalent groups of the formulate —NR—, —O—, —S—, —SO$_2$, —COO—, —OOC—, —CONR—, —NRCO—, —SO$_2$NR— and NRSO$_2$—, or a branched-chain or straight-chain alkylene radical with 1 to 10 carbon atoms having a —SO$_2$NR— or a —CONR— groups at one end, whereby the radical $R_f$ is linked with the sulphuric atom or the carbon atom of this group, and X'—H=—CON(R)H or SO$_2$N(R)H or —SH and R is an alkyl radical with 1 to 6 C-atoms, with a compound of the formula II $$HO[CH_2-C(CH_2Y)_2CH_2O]_nH \qquad (II)$$

wherein Y=Cl, Br or I and n=1, 2 or 3 and whereby per mol equivalent Y of the formula II about 1 mol of the compound of the formula I are applied, the reaction being performed in the presence of an alkali metal carbonate whereby the alkali metal carbonate is present in an amount sufficient for the substantially complete neutralization of the resulting acid HY, the reaction being performed in an aprotic solvent at elevated temperature, whereby a reaction product of the formula III

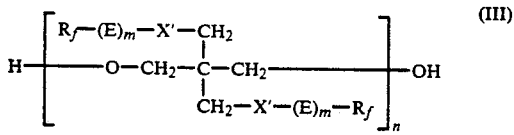

is obtained, wherein the improvement comprises carrying out the reaction (1st step) in an aprotic solvent which is substantially insoluble in water and in the presence of an aqueous solution of the alkali metal carbonate, subsequently removing the phase containing the aqueous salt solution, and removing the remaining residual water from the organic phase.

2. A process according to claim 1 wherein a diol of formula III, without being isolated, is reacted in a 2nd step with a di-, tri- or polyvalent aliphatic, alicyclic or aromatic isocyanate, in particular with a divalent isocyanate of the formula IV $$A(NCO)_2 \qquad (IV)$$

wherein A is an unsubstituted or substituted aliphatic, alicyclic or aromatic divalent radical, the reaction being performed in an organic solvent in such a way that a prepolymer is formed which contains free hydroxyl- or free isocyanate groups and wherein in a 3rd step this prepolymer is reacted in an organic solvent with a further di-, tri-or polyvalent aliphatic, alicyclic or aromatic isocyanate, in particular with a divalent isocyanate of the formula $$A'(NCO)_2 \qquad (IV')$$

wherein A' has the same significance as A or with a chain-extending agent containing at least 2 hydroxyl groups or with a combination of a further isocyanate and such a chain-extending agent, whereby a polyurethane containing perfluoroalkyl groups is formed, and wherein the solvent is or is not removed subsequently.

3. A process according to claim 1, wherein the concentration of the alkali metal carbonate in water is adjusted at least to such a value that the density of the alkali halide solution formed in the first reaction step is sufficiently high so that after termination of the 1st reaction step the aqueous phase separates as a phase below the organic phase.

4. A process according to claim 1, wherein potassium carbonate is used as alkali metal carbonate.

5. A process according to claim 1, wherein the first reaction step is carried out under increased pressure.

6. A process according to claim 5, wherein the first reaction step is carried out under autogenous pressure.

7. A process according to claim 2, wherein the same solvent is used for the 1st, 2nd and 3rd reaction step.

8. A process according to claim 1, wherein the solvent used for the first reaction step has a boiling point exceeding 90° C. at atmospheric pressure, in particular a boiling point exceeding 110° C.

9. A process according to claim 1, wherein methyl isobutylketone is used as aprotic solvent.

10. A process according to claim 1, wherein as compound of the formula II a compound is used in which Y=Br and n=1.

11. A process according to claim 1, wherein in the formula I E is an alkylene radical with 2 to 6 C-atoms, X'=—S— and m=1.

12. A process according to claim 1, wherein as compound IV an aliphatic diisocyanate and as compound IV' an alicyclic diisocyanate is used.

13. A process according to claim 12, wherein as aliphatic diisocyanate hexamethylene diisocyanate or trimethyl hexamethylene diisocyanate and as alicyclic diisocyanate a diisocyanate derived from a dimeric fatty acid is used.

14. A process according to claim 2, wherein polyethoxylated N-alkyl-diethanolamines are used as chain-extending agents.

15. A process according to claim 2, wherein N-methyl-diethanolamine is used as chain-extending agent.

16. A process according to claim 2, wherein in the second reaction step a diisocyanate and such a quantity of the solution obtained after the 1st reaction step are used that this quantity contains 1.1 to 1.6 mol of a compound III per mol diisocyanate.

17. A process according to claim 1, wherein in the second reaction step an isocyanate of formula IV and that in the third reaction step an isocyanate of formula IV' is used and that the molar ratio of the isocyanate of the second reaction step (IV) to the isocyanate of the third reaction step (IV') is 0.3 to 1.8.

18. A process according to claim 2, wherein the aliphatic alicyclic or aromatic isocyanate of the 2nd step is a divalent isocyanate of the formula (IV)

$$A(NCO)_2 \qquad (IV)$$

and wherein the aliphatic, alicyclic or aromatic isocyanate of the 3rd step is a divalent isocyanate of the formula (IV')

$$A'(NCO)_2 \qquad (IV')$$

and each of A and A' being an unsubstituted or substituted aliphatic, alicyclic or aromatic divalent radical.

19. A process according to claim 8, wherein the solvent used for the first reaction step has a boiling point exceeding 110° C. at atmospheric pressure.

20. A process according to claim 1, wherein the first reaction step is carried out in the presence of a phase transfer catalyst.

21. A process according to claim 18, wherein the molar ratio of the isocyanate of the second reaction step (IV) to the isocyanate of the third reaction step (IV') is 0.6 to 1.6.

* * * * *